(12) United States Patent
Cvelbar et al.

(10) Patent No.: US 11,193,412 B2
(45) Date of Patent: Dec. 7, 2021

(54) AUTOMOTIVE EXHAUST AFTERTREATMENT SYSTEM

(71) Applicant: Faurecia Emissions Control Technologies, USA, LLC, Columbus, IN (US)

(72) Inventors: Randy Cvelbar, Columbus, IN (US); Eduardo Alano, Columbus, IN (US); Amee Bhatt, Columbus, IN (US); Amaresh Rakkasagi, Karnataka (IN)

(73) Assignee: Faurecia Emissions Control Technologies, USA, LLC, Columbus, IN (US)

(*) Notice: Subject to any disclaimer, the term of this patent is extended or adjusted under 35 U.S.C. 154(b) by 108 days.

(21) Appl. No.: 16/587,649

(22) Filed: Sep. 30, 2019

(65) Prior Publication Data

US 2021/0095587 A1   Apr. 1, 2021

(51) Int. Cl.
*F01N 3/20* (2006.01)
*F01N 3/28* (2006.01)

(52) U.S. Cl.
CPC ........... *F01N 3/208* (2013.01); *F01N 3/2892* (2013.01); *F01N 2240/20* (2013.01); *F01N 2610/02* (2013.01); *F01N 2610/08* (2013.01); *F01N 2610/1453* (2013.01)

(58) Field of Classification Search
CPC ............. F01N 2240/20; F01N 2470/18; F01N 2610/02; F01N 2610/1453; F01N 3/021; F01N 3/2066; F01N 3/208; F01N 3/2892; F01N 13/009; F01N 13/0097; F01N 13/14; F01N 2260/20; F01N 2470/02; F01N 2470/06; F01N 2470/08; F01N 2610/08; F01N 2610/1406; F01N 2900/00; F01N 3/2006; B01F 2005/0017; B01F 5/0606; B01F 5/0471; B01F 5/0065; B01F 5/0688; B01F 2005/0091
See application file for complete search history.

(56) References Cited

U.S. PATENT DOCUMENTS

| | | | |
|---|---|---|---|
| 9,217,348 B2* | 12/2015 | Kimura | F01N 3/2066 |
| 9,341,100 B2* | 5/2016 | Petry | F01N 13/14 |
| 10,287,948 B1* | 5/2019 | Moulieres | B01D 46/0027 |
| 10,486,117 B2* | 11/2019 | Tyni | B01F 5/0606 |
| 10,914,215 B2* | 2/2021 | Jaruvatee | F01N 3/2066 |
| 2016/0215673 A1* | 7/2016 | Noren, IV | B01F 5/0057 |
| 2016/0317986 A1* | 11/2016 | Alano | F01N 3/021 |
| 2016/0319720 A1* | 11/2016 | Alano | B01F 5/0065 |
| 2016/0319724 A1* | 11/2016 | Alano | B01F 5/0614 |
| 2017/0082007 A1* | 3/2017 | Alano | F01N 3/2066 |
| 2020/0271035 A1* | 8/2020 | Gattani | B01F 5/04 |

FOREIGN PATENT DOCUMENTS

| | | |
|---|---|---|
| CN | 106523092 A | 3/2017 |
| WO | 2014098728 A1 | 6/2014 |

* cited by examiner

*Primary Examiner* — Anthony Ayala Delgado
(74) *Attorney, Agent, or Firm* — Barnes & Thornburg LLP

(57) ABSTRACT

An automotive exhaust aftertreatment system includes a reagent mixer. The reagent mixer includes a mixer body and doser that injects a reagent into the mixer body. The reagent mixer mixes an exhaust gases and the reagent prior to the exhaust gases being discharged from the reagent mixer.

18 Claims, 3 Drawing Sheets

AUTOMOTIVE EXHAUST AFTERTREATMENT SYSTEM

BACKGROUND

The present disclosure relates to exhaust aftertreatment systems for automotive applications, and particularly to a reagent mixer for injecting and mixing a reagent into exhaust gases.

SUMMARY

A vehicle, in accordance with the present disclosure, includes a combustion engine and an exhaust aftertreatment system. The engine produces exhaust gases during operation that are transferred to the aftertreatment system via an exhaust passageway. The aftertreatment system is configured to inject a reagent, such as diesel emission fluid, into the exhaust gases. The reagent combines with the exhaust gases to cause a chemical reaction and reduce effluents, such as nitrous oxides (NOx), in the exhaust gases before they are released into the atmosphere.

In illustrative embodiments, the exhaust aftertreatment system includes a reagent mixer that is configured to induce rotation of the exhaust gases and the reagent to encourage mixing. The reagent mixer includes a mixer body, a doser, and a swirl unit. The mixer body extends along a primary axis. The doser is configured to discharge the reagent into the mixer body along a doser axis that is perpendicular to the primary axis so as to create a mixture with exhaust gases in the mixer body. The swirl unit is configured to rotate the mixture and to increase a transformation rate of $NO_x$ in the mixture into molecular nitrogen and water vapor by enhancing mixing of the reagent with the exhaust gases.

In the illustrative embodiment, the swirl unit is configured to encourage the exhaust gases to swirl around an injection point of the reagent and to draw the reagent away from the doser axis as it is injected into the mixer. The swirl unit includes an inlet reactor and an outlet reactor that cooperate with one another to define a swirl chamber that extends into the mixer along the doser axis. The inlet reactor receives a majority of the exhaust gases flowing through the exhaust passageway and is shaped to start swirling motion of the gases around the injection point. The outlet reactor is coupled to a distal end of the inlet reactor. The outlet reactor is closed its distal end to block and reverse the direction of flow of the exhaust gases along the doser axis past the distal end.

In the illustrative embodiment, the inlet reactor provides a first flow passageway and a second flow passageway that direct the exhaust gases toward the injection point of the reagent and cause rotation of the exhaust gases in the swirl chamber. The exhaust gases continue to swirl around the doser axis as they travel along the doser axis toward the outlet reactor.

The outlet reactor is formed to include a plurality of outlet holes arranged circumferentially around the doser axis. The plurality of outlet holes are configured to discharge the exhaust gases and the reagent from the swirl chamber in a plurality of directions radially away from the doser axis.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 3:
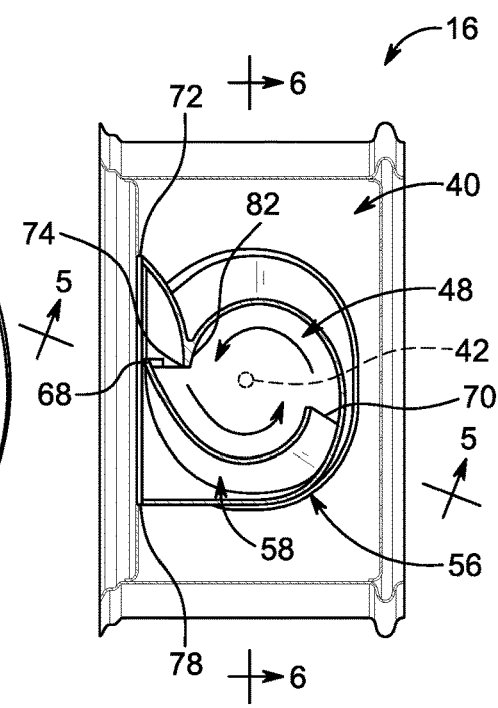
FIG. 3 is a sectional view of the reagent mixer taken along line 3-3 in FIG. 2 looking into the swirl unit along the doser axis and showing that the swirl unit includes an inlet reactor that is formed to include a plurality of flow passageways that receive the exhaust gases and direct the exhaust gases to a swirl chamber where the exhaust gases and the reagent are mixed together.
Figure 5:
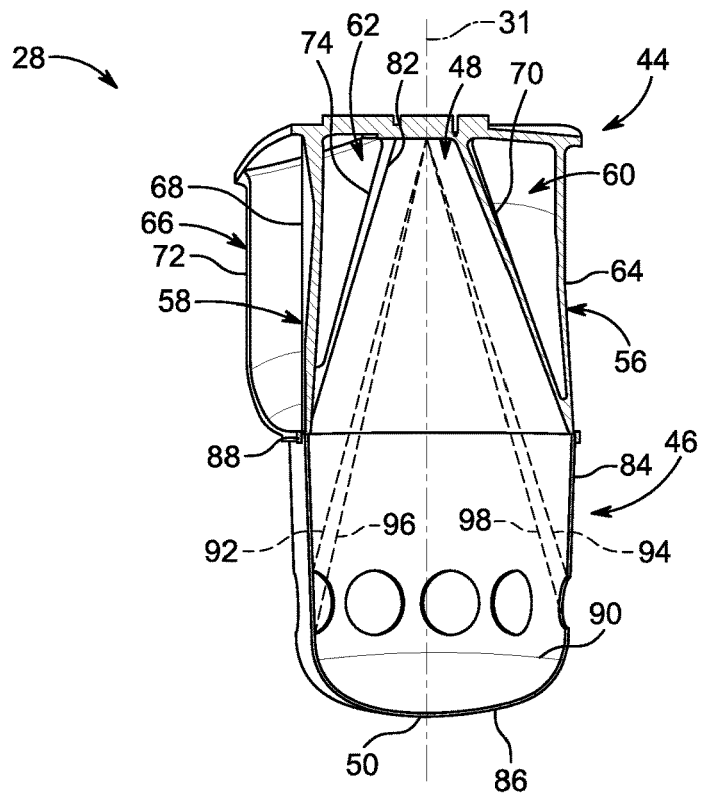
Figure 6:
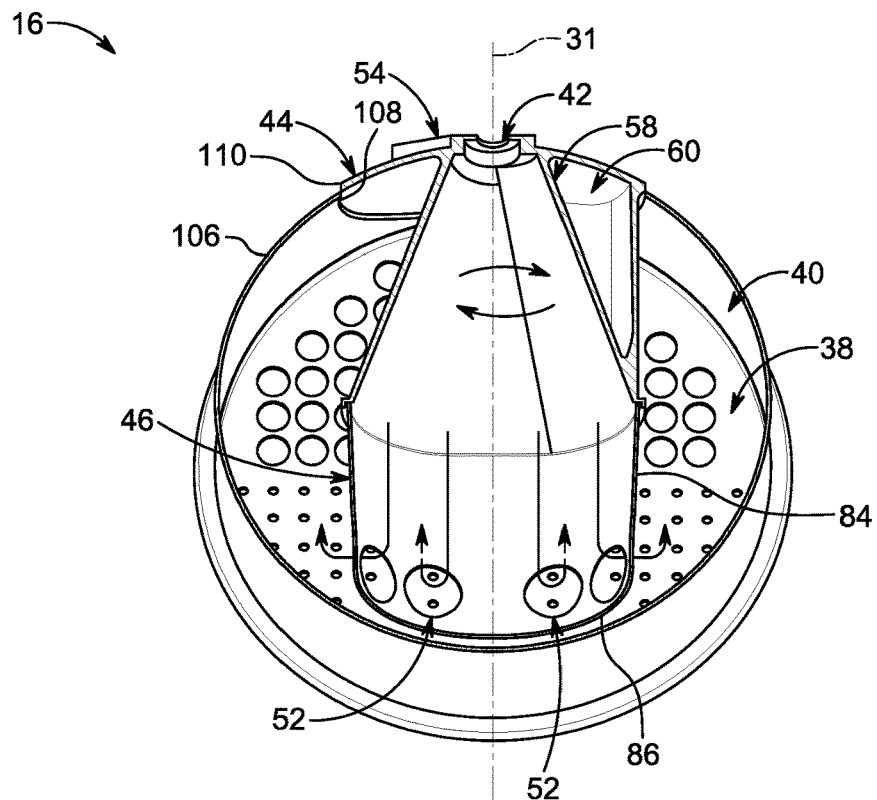

FIG. 5 is a cross section of the swirl unit taken along line 5-5 in FIG. 3 showing that the flow passageways have a triangular shape to direct a majority of the engine exhaust gases entering the flow passageways toward an injection point of the reagent and showing that swirl unit is sized selectively so that the reagent is directed away from the plurality of holes in the outlet reactor; and FIG. 6 is a perspective view with a cross section taken along line 6-6 in FIG. 3 with arrows showing that the swirl unit is configured to induce rotation in the swirl chamber to mix the exhaust gases and the reagent together before the exhaust gases and the reagent are discharged through the plurality of holes in the outlet reactor.

DETAILED DESCRIPTION

For the purposes of promoting an understanding of the principles of the disclosure, reference will now be made to a number of illustrative embodiments illustrated in the drawings and specific language will be used to describe the same.

Figure 1:
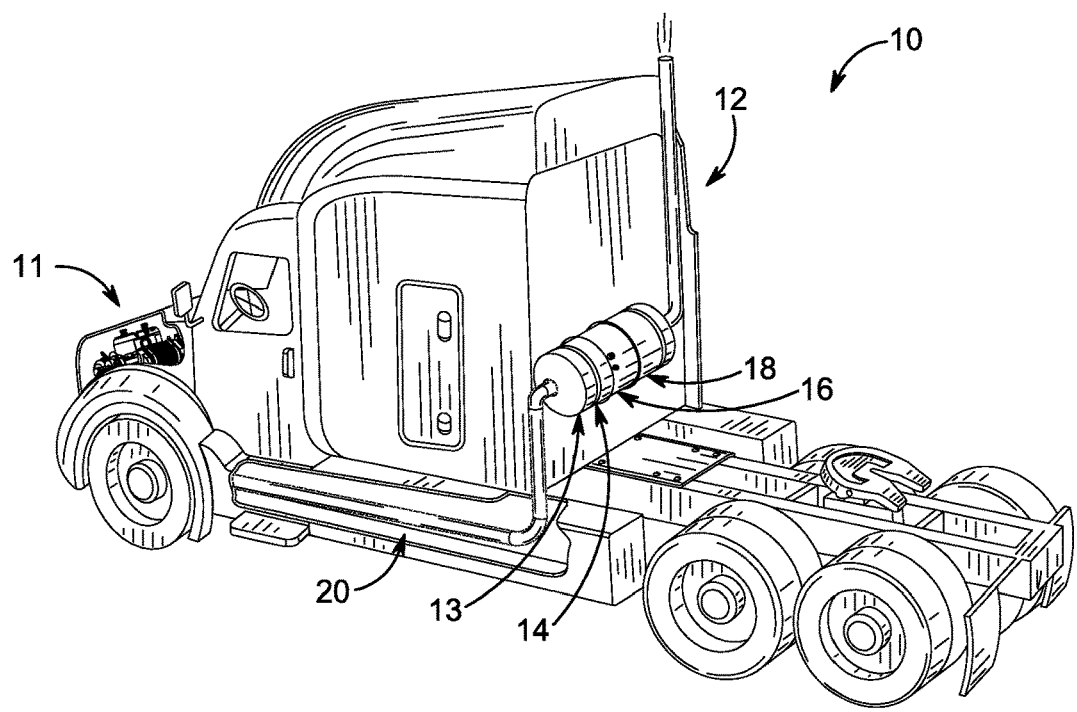
FIG. 1 is perspective view of an over-the-road vehicle that includes a combustion engine and an automotive exhaust aftertreatment system for reducing various effluents, such as nitrogen oxides ($NO_x$), in engine exhaust gases before releasing the engine exhaust gases into the atmosphere.

An illustrative over-the-road vehicle 10 is shown in FIG. 1 and includes a combustion engine 11 and an automotive exhaust aftertreatment system 12. An exhaust passageway 20 is configured to direct engine exhaust gases produced by the engine 11 to the exhaust aftertreatment system 12. The aftertreatment system 12 includes a diesel oxidation catalyst (DOC) 13, a diesel particulate filter (DPF) 14, a reagent mixer 16, and a selective catalytic reduction unit (SCR) 18, for example. The DOC 13, the DPF 14, the reagent mixer 16, and the SCR 18 are configured to treat the exhaust gases and remove effluents from the exhaust gases before releasing the exhaust gases into the atmosphere.

Figure 2:
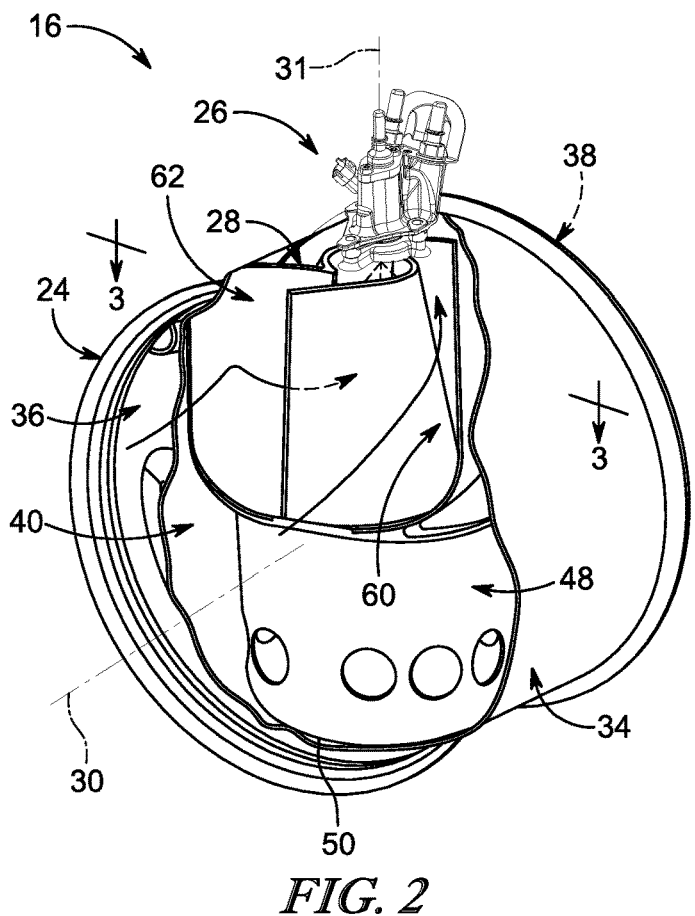
FIG. 2 is an enlarged perspective view of a reagent mixer included in the exhaust aftertreatment system with a portion cut away showing that the reagent mixer includes a swirl unit configured to rotate/redirect the engine exhaust gases and a doser configured to inject a reagent into the swirl unit along a doser axis.

In the illustrative embodiment, the reagent mixer 16 includes a mixer body 24, a doser 26, and a swirl unit 28 as shown in FIG. 2. The mixer body 24 defines a portion of the exhaust passageway 20 and extends along a primary axis 30. The doser 26 is configured to discharge a reagent into the exhaust passageway 20 along a doser axis 31 that is perpendicular to the primary axis 30. Chemical reaction between the reagent and a catalyst in the SCR 18 transforms nitrogen oxides ($NO_x$) present in the exhaust gases into molecular nitrogen and water vapor which are not harmful to the environment. The swirl unit 28 is configured to increase a transformation rate of the NO$_x$ in the SCR 18 by enhancing mixing of the reagent with the exhaust gases upstream of the SCR 18.

The mixer body 24 includes a mixer can 34, an upstream baffle 36, and an optional downstream baffle 38 as shown in FIGS. 2 and 3. The mixer can 34, the upstream baffle 36 and the downstream baffle 38 cooperate to provide a mixing chamber 40. The mixer can 34 extends circumferentially around the primary axis 30. The upstream baffle 36 is arranged generally perpendicular to the primary axis. The upstream baffle 36 directs a majority of the exhaust gases into a primary inlet aperture 32 while a smaller portion of the exhaust gases is directed through bypass passages 33 shown in FIG. 4. The downstream baffle 38 is arranged generally perpendicular to the primary axis 30 downstream of the upstream baffle 36 and the swirl unit 28.

The doser 26 is mounted to the swirl unit 28 and injects reagent into the mixing chamber 40 at an injection point 42 as shown in FIGS. 2 and 3. In some embodiments, the doser 26 may be mounted to the mixer body 24. In the illustrative embodiment, the reagent is an aqueous urea solution such as Diesel Emission Fluid (DEF). In other embodiments, a gaseous reagent may be used.

The swirl unit 28 is positioned axially between the upstream baffle 36 and the downstream baffle 38 in the mixing chamber 40 as shown in FIGS. 2 and 3. The inlet aperture 32 is formed in the upstream baffle 36 directly upstream of the injection point 42 so that the majority of exhaust gases enter the mixing chamber 40 through the inlet aperture 32 directly adjacent to the injection point 42. In use, at least 50% of the exhaust gases enters the inlet aperture 32 and are guided by the swirl unit 28 to the injection point 42. In some embodiments, at least 80% of the exhaust gases enter the inlet aperture 32 and are guided by the swirl unit 28 to the injection point 42. In some embodiments, at least 90% of the exhaust gases enter the inlet aperture 32 and are guided by the swirl unit 28 to the injection point 42. The remaining portion of the exhaust gases enters the bypass passages 33 formed in the upstream baffle 34 as shown in FIG. 4.

The swirl unit 28 is configured to encourage the exhaust gases to swirl around the injection point 42 to block deposits from forming on surrounding structures in the reagent mixer 16. The swirl unit 28 includes an inlet reactor 44 and an outlet reactor 46 that cooperate with one another to define a swirl chamber 48 in the mixing chamber 40 as shown in FIGS. 2 and 3. The inlet reactor 44 is aligned axially and radially with the inlet aperture 32 relative to the primary axis 30. The inlet reactor 44 is also aligned axially with the doser 26 relative to the doser axis 31. The outlet reactor 46 is coupled to a distal end of the inlet reactor 44 spaced axially from the injection point 42 relative to the doser axis 31.

The outlet reactor 46 is sized with a diameter that matches the distal end of the inlet reactor 44 to provide a smooth transition from the inlet reactor 44 to the outlet reactor 46. The outlet reactor 46 is closed at a distal end 50 to block and reverse direction of the exhaust gases flow along the doser axis 31. The outlet reactor 46 is formed to include a plurality of outlet holes 52 arranged circumferentially around the doser axis 31. The plurality of outlet holes 52 are configured to discharge the exhaust gases from the swirl chamber 48 into the exhaust passageway 20, more specifically the mixing chamber 40, in a plurality of directions radially away from the doser axis 31.

Figure 4:
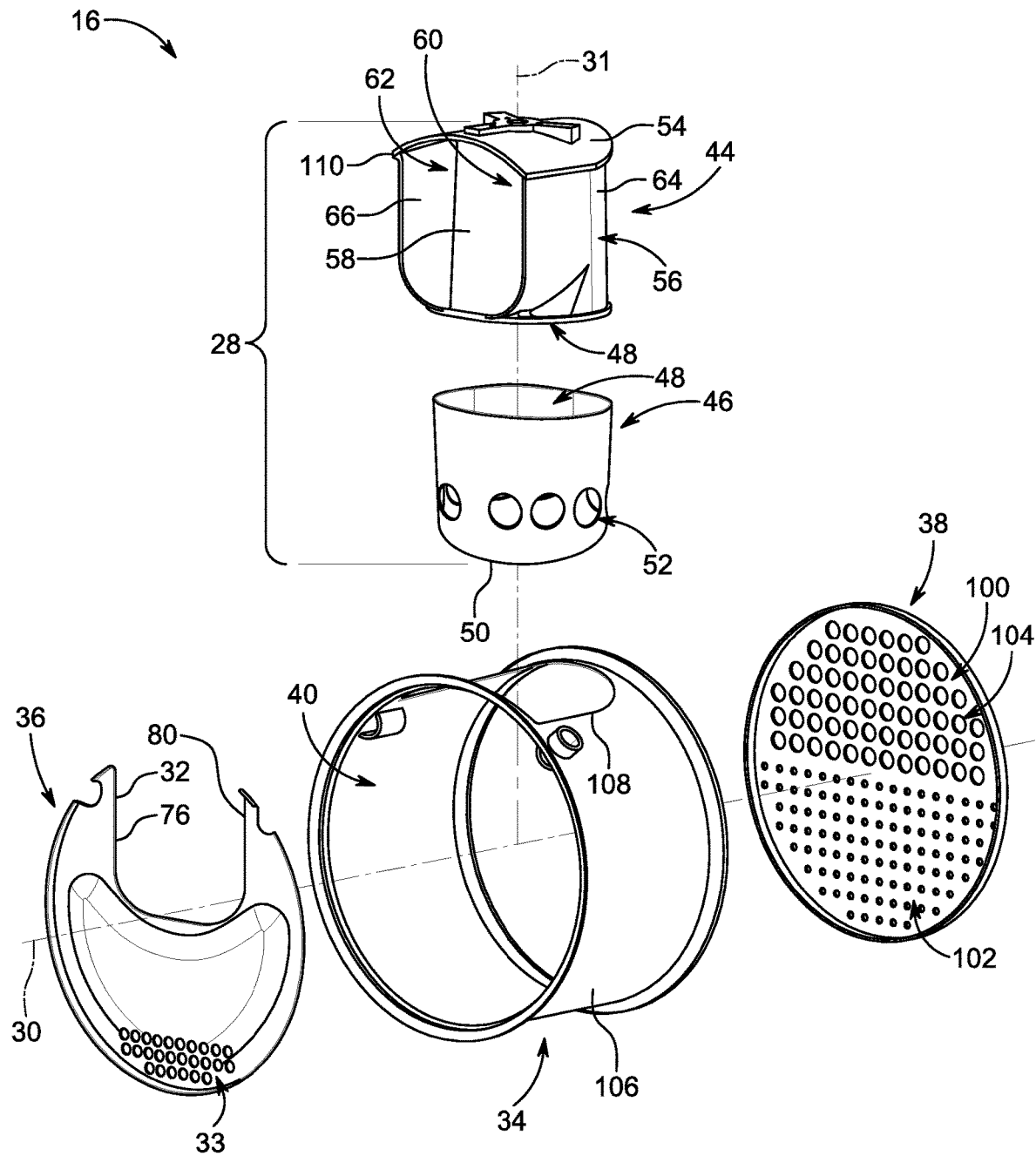
FIG. 4 is an exploded assembly view of the reagent mixer showing that the reagent mixer includes a mixer body, an upstream baffle, and a downstream baffle and showing that the swirl unit includes a doser mount, the inlet reactor, and an outlet reactor with a plurality of discharge holes to release the exhaust gases out of the swirl chamber after they are mixed with reagent.

The inlet reactor 44 includes a doser mount 54, an outer chamber wall 56, and a first flow-directing fin 58 as shown in FIGS. 2-4. The doser mount 54 is coupled to the mixer body 24 and is configured to receive the doser 26 to mount the doser 26 to the swirl unit 28. The outer chamber wall 56 is coupled to doser mount 56 and extends axially into the mixing chamber 40 relative to the doser axis 31. The outer chamber wall 56 provides a radial boundary of the swirl chamber 48 relative to the doser axis 31. The first flow-directing fin 58 is coupled to the doser mount 54 and extends into the swirl chamber to provide a first flow passageway 60 and a second flow passageway 62. The first flow passageway 60 and the second flow passageway 62 each receive respective streams of exhaust gases through the inlet aperture 32. The first and second flow passageways 60, 62 direct the streams into the swirl chamber 48 at opposite circumferential location relative to the doser axis 31 to cause rotation of the exhaust gases in the swirl chamber 48.

The outer chamber wall 56 includes a peripheral wall 64 and a second flow-directing fin 66 as shown in FIGS. 2 and 3. The peripheral wall 64 cooperates with the first flow-directing fin 58 to define the first flow passageway 60. The second flow-directing fin 66 is coupled with the peripheral wall 64 and cooperates with the first-flow directing fin 58 to define the second flow passageway 62. In the illustrative embodiment, the first flow passageway 60 and the second flow passageway 62 have a triangular shape when viewed perpendicular to the doser axis 31.

The outer chamber wall 56 and the first flow-directing fin 58 cooperate to provide a swirl cone that defines at least a portion of the swirl chamber 48 as shown in FIGS. 3, 5 and 6. The swirl cone increases in size as the inlet reactor 44 extends axially from the doser mount 54 to the outlet reactor 46 along the doser axis 31. The first flow-directing fin 58 includes a first end 68 located at the inlet aperture 32 and a second end 70 downstream of the first end 68 in the swirl chamber 48. The first end 68 extends into the mixing chamber 40 generally parallel with the doser axis 31. The first flow-directing fin 58 bends inwardly toward the doser axis 31 downstream of the first end 68 so that the second end 70 extends into the mixing chamber 40 at an angle relative to the doser axis 31. The second end 70 is angled inwardly toward the doser axis 31 to provide the triangular shape of the first flow passageway 60.

The second flow-directing fin 66 includes a first end 72 at a first edge 76 of the inlet aperture 32 and a second end 74 downstream of the first end 72 in the swirl chamber 48 as shown in FIGS. 3 and 5. The first end 72 extends into the mixing chamber 40 generally parallel with the doser axis 31. The second flow-directing fin 66 bends inwardly toward the doser axis 31 downstream of the first end 72 so that the second end 74 extends into the mixing chamber 40 at an angle relative to the doser axis 31. The second end 74 is angled inwardly toward the doser axis 31 to provide the triangular shape of the second flow passageway 62 as shown in FIG. 5.

The peripheral wall 64 includes a first end 78 at a second edge 80 of the inlet aperture 32 and a second end 82 coupled to the second end 74 of the second flow-directing fin 66 as shown in FIGS. 3 and 5. The first end 78 extends into the mixing chamber 40 generally parallel with the doser axis 31. The second end 82 extends into the mixing chamber 40 at an angle relative to the doser axis 31 with the second end 74 of the second flow-directing fin 66. The first flow-directing fin 58 is at least partially angled away from the peripheral wall 64 to provide the triangular shape of the first flow passageway 60 as shown in FIG. 5.

The outlet reactor 46 includes a side wall 84 and a dome cap 86 as shown in FIGS. 5 and 6. The side wall 84 has a cylindrical shape and extends along the doser axis 31 from a proximal end 88 to a distal end 90. The side wall 84 is coupled to the inlet reactor 44 at the proximal end 88. The dome cap 86 is coupled to the side wall 84 at the distal end 90 and provides the closed end 50 of the outlet reactor 46. In the illustrative embodiment, the plurality of outlet holes 52 are spaced apart from the proximal end 88 greater than 50 percent of a length of the outlet reactor 46 defined between the proximal end 88 and the distal end 90. In this way, the exhaust gases and the reagent in the swirl chamber 48 travel across nearly the entire diameter of the mixing chamber 40. This increases an amount of time the exhaust gases and reagent spend in the swirl chamber and increases mixing of the reagent and the exhaust gases.

In some embodiments, the plurality of outlet holes 52 in the outlet reactor 46 are spaced selectively from the injection point 42 of the doser 26 axially along the doser axis 31 so that a trajectory of the reagent is away from each of the plurality of outlet holes 52 as suggested in FIG. 5. The dashed lines in FIG. 5 represent limits where the plurality of outlet holes 52 may be formed in the outlet reactor 46 to avoid injecting the reagent toward edges of the plurality of holes 52. In some embodiments, the reagent is injected toward the side wall 84 upstream of the plurality of holes 52 as suggested by limit lines 92, 94. In other embodiments the reagent is injected toward the side wall 84 downstream of the plurality of holes 52 as suggested by limit lines 96, 98.

In the illustrative embodiment, the mixer body 24 further includes a downstream baffle 38 as shown in FIGS. 4 and 6. The downstream baffle 38 extends across the exhaust passageway 20 perpendicular to the primary axis 30. The downstream baffle 36 is formed to include a plurality of discharge openings 100 that increase in size as the downstream baffle 38 extends axially along the doser axis 31 from the outlet reactor 46 to the inlet reactor 44. The downstream baffle 38 encourages further mixing of the exhaust gases in the mixing chamber 40 before the exhaust gases are released through the plurality of discharge openings 100 toward the SCR 18.

In the illustrative embodiment, a first half of the downstream baffle 38 is formed to include a first plurality of discharge openings 102 with a first diameter and a second half of the downstream baffle 38 is formed to include a second plurality of discharge openings 104 with a second diameter. The first diameter is less than the second diameter. The plurality of holes 52 in the outlet reactor 46 are axially aligned with the first half of the downstream baffle 36 relative to the primary axis 30. The exhaust gases exiting the plurality of holes 52 are encouraged to flow toward the second half of the downstream baffle 38 increasing time spent in the mixing chamber and mixing with the reagent.

The mixer can 34 includes a sidewall 106 that is formed to include a sidewall aperture 108 that receives the swirl unit 28 as shown in FIG. 4. The swirl unit 28 is inserted into the aperture 108. A perimeter edge 110 of the doser mount 54 is sized slightly larger than the aperture 108. Once the swirl unit 28 is fully inserted, the perimeter edge 110 is coupled to the sidewall 106 to locate the swirl unit 28 relative to the mixer can 34. The outlet reactor 46 is spaced apart from the mixer can 34 such that the swirl unit 28 is simply supported in the mixing chamber 40 by the doser mount 54. In this way, the swirl unit 28 is a subassembly that can be manufactured separately from the mixer body and then assembled later.

In some embodiments, the present disclosure of mixer 16 may achieve high DEF (reagent) mixing performance in a compact mixer with limited backpressure generation. The mixer is comprised of an inlet reactor 44 and an outlet reactor 46. The inlet reactor 44 is a structure to generate swirling and the outlet reactor 46 is designed to propagate the swirling created at the inlet and lead the mixture towards the outlet baffle 38

In some embodiments, the inlet reactor 44 promotes swirl around the urea injection spray point 42 which pulls the urea droplets radially away from the doser axis increasing the distribution of the droplets across a large surface area. The swirling flow may be contained in a reactor that allows the swirl to continue nearly across the full diameter of the compact mixer 16 before exiting to travel towards the outlet baffle 38. The use of inlet reactor 44 with a swirl around the spray cone may make better use of the available space to spread out the droplets and reduce the local cooling effect that could be generated by a localized impingement on surrounding structures in the mixer 16.

In some embodiments, the mixer 16 guides most of the exhaust flow towards the inlet reactor. This is accomplished by the inlet baffle 34. The exhaust flow goes thru one or more triangular shaped passageways 60, 62 to create a swirl centered around the urea spray point 42. The inlet reactor 44 is used to keep the swirl centered so that it doesn't deflect the spray to one side but keeps the core of the spray centered as it travels nearly across the full diameter of the mixer 16. The swirling flow created at the inlet reactor 44 will pull the smaller droplets away from the doser axis 31 in order to better disperse the urea throughout the mixer 16. The conical shape of the inlet reactor 44 allows for a smooth transition into the outlet reactor 46 that is attached to the conical section. This smooth transition should allow the urea droplets to continue to get spread around the walls as the swirl continues along the axis 31 and around the perimeter of the reactor until the swirl exits the chamber 48 after utilizing the majority of the mixer diameter for mixing the urea with the exhaust gas.

The following numbered clauses include embodiments that are contemplated and non-limiting:

Clause 1. 1. A reagent mixer comprising a mixer body including a mixer can defining at least a portion of an exhaust passageway that extends along a primary axis and an upstream baffle plate formed to include a primary inlet aperture that opens downstream to allow exhaust gases to flow therethrough parallel with the primary axis, a doser configured to inject a reagent into the exhaust passageway generally along a doser axis that is perpendicular to the primary axis, and a swirl unit including (a) an inlet reactor configured to induce rotation of the exhaust gases flowing through the primary inlet aperture about and along the doser axis and (b) an outlet reactor coupled to the inlet reactor and cooperating with the inlet reactor to provide a swirl chamber that extends along the doser axis, wherein the outlet reactor has a distal end that is closed to block flow of the exhaust gases along the doser axis past the distal end and is formed to include a plurality of outlet holes arranged circumferentially around the doser axis and configured to discharge the exhaust gases from the swirl chamber into the exhaust passageway in a plurality of directions radially away from the doser axis.

Clause 2. The mixer or vehicle of any other suitable clause or combination of clauses, wherein the inlet reactor provides a swirl cone defining at least a portion of the swirl chamber and includes a doser mount coupled to the mixer body and configured to receive the doser, an outer chamber wall that extends axially into the exhaust passageway relative to the doser axis and provides a radial boundary of the swirl chamber, and a first flow-directing fin that extends into the swirl chamber to provide a first flow passageway and a second flow passageway.

Clause 3. The mixer or vehicle of any other suitable clause or combination of clauses, wherein the outer chamber wall includes a peripheral wall that cooperates with the first flow-directing fin to define the first flow passageway and a second flow-directing fin that cooperates with the first-flow directing fin to define the second flow passageway.

Clause 4. The mixer or vehicle of any other suitable clause or combination of clauses, wherein the first flow passageway and the second flow passageway are triangular shaped when viewed perpendicularly to the doser axis.

Clause 5. The mixer or vehicle of any other suitable clause or combination of clauses, wherein the first flow-directing fin includes a first end that extends into the exhaust passageway generally parallel with the doser axis and a second end arranged in the swirl chamber that extends into the exhaust passageway at an angle relative to the doser axis.

Clause 6. The mixer or vehicle of any other suitable clause or combination of clauses, wherein the second flow-directing fin includes first end defining a first edge of the primary inlet aperture that extends into the exhaust passageway generally parallel with the doser axis and a second end coupled to the peripheral wall that extends into the exhaust passageway at an angle relative to the doser axis.

Clause 7. The mixer or vehicle of any other suitable clause or combination of clauses, wherein the peripheral wall includes a first end defining a second edge of the primary inlet aperture that extends into the exhaust passageway generally parallel with the doser axis and a second end coupled to the second flow-directing fin that extends into the exhaust passageway at an angle relative to the doser axis.

Clause 8. The mixer or vehicle of any other suitable clause or combination of clauses, wherein the outlet reactor includes a side wall at a proximal end of the outlet reactor and a dome at a distal end of the outlet reactor providing the closed end and defining a length of the outlet reactor between the proximal end and the distal end and the plurality of holes are spaced apart from the proximal end of the outlet reactor greater than 50 percent of the length.

Clause 9. The mixer or vehicle of any other suitable clause or combination of clauses, wherein the plurality of holes in the outlet reactor are spaced selectively from an injection point of the doser axially along the doser axis so that a trajectory of the reagent is directed away from each of the plurality of holes.

Clause 10. The mixer or vehicle of any other suitable clause or combination of clauses, wherein the mixing can further includes a downstream baffle that extends across the exhaust passageway perpendicular to the primary axis and the downstream baffle is formed to include a plurality of discharge openings that increase in size as the downstream baffle extends axially along the doser axis from the outlet reactor to the inlet reactor to encourage further mixing of the exhaust gases between the swirl unit and the downstream baffle before the exhaust gases are released through the plurality of discharge openings.

Clause 11. An over-the-road vehicle comprising
a combustion engine, and
an automotive exhaust aftertreatment system coupled to the combustion engine to receive an exhaust gases from the combustion engine, the automotive exhaust aftertreatment system including:
a mixer body including a mixer can defining at least a portion of an exhaust passageway that extends along a primary axis and an upstream baffle plate formed to include a primary inlet aperture that opens downstream to allow exhaust gases to flow therethrough parallel with the primary axis,
a doser configured to inject a reagent into the exhaust passageway generally along a doser axis that is perpendicular to the primary axis, and
a swirl unit including (a) an inlet reactor configured to induce rotation of the exhaust gases flowing through the primary inlet aperture about and along the doser axis and (b) an outlet reactor coupled to the inlet reactor and cooperating with the inlet reactor to provide a swirl chamber that extends along the doser axis, wherein the outlet reactor has a distal end that is closed to block flow of the exhaust gases along the doser axis past the distal end and is formed to include a plurality of outlet holes arranged circumferentially around the doser axis and configured to discharge the exhaust gases from the swirl chamber into the exhaust passageway in a plurality of directions radially away from the doser axis.

The invention claimed is:

1. A reagent mixer comprising
a mixer body including a mixer can defining at least a portion of an exhaust passageway that extends along a primary axis and an upstream baffle plate formed to include a primary inlet aperture that allows exhaust gases to flow therethrough parallel with the primary axis,
a doser configured to inject a reagent into the exhaust passageway generally along a doser axis that is perpendicular to the primary axis, and
a swirl unit including (a) an inlet reactor configured to induce rotation of the exhaust gases flowing through the primary inlet aperture about and along the doser axis and (b) an outlet reactor coupled to the inlet reactor and cooperating with the inlet reactor to provide a swirl chamber that extends along the doser axis, wherein the outlet reactor has a distal end that is closed to block flow of the exhaust gases along the doser axis past the distal end and is formed to include a plurality of outlet holes arranged circumferentially around the doser axis and configured to discharge the exhaust gases from the swirl chamber into the exhaust passageway in a plurality of directions radially away from the doser axis,
wherein the plurality of holes in the outlet reactor are spaced selectively from an injection point of the doser axially along the doser axis at a predetermined distance so that a trajectory of the reagent injected by the doser is directed away from an outer edge of each of the plurality of holes.

2. The reagent mixer of claim 1, wherein the plurality of holes are radially aligned so that the plurality of holes form a row extending circumferentially around the doser axis.

3. The reagent mixer of claim 2, wherein the plurality of holes are spaced selectively from the injection point at the predetermined distance so that the trajectory of the reagent directs the reagent upstream of the outer edge of each of the plurality of holes.

4. The reagent mixer of claim 2, wherein the plurality of holes are spaced selectively from the injection point at the predetermined distance so that the trajectory of the reagent directs the reagent downstream of the outer edge of each of the plurality of holes.

5. A reagent mixer comprising
a mixer body including a mixer can defining at least a portion of an exhaust passageway that extends along a primary axis and an upstream baffle plate formed to include a primary inlet aperture that allows exhaust gases to flow therethrough parallel with the primary axis, a doser configured to inject a reagent into the exhaust passageway generally along a doser axis that is perpendicular to the primary axis, and a swirl unit including (a) an inlet reactor configured to induce rotation of the exhaust gases flowing through the primary inlet aperture about and along the doser axis and (b) an outlet reactor coupled to the inlet reactor and cooperating with the inlet reactor to provide a swirl chamber that extends along the doser axis, wherein the outlet reactor has a distal end that is closed to block flow of the exhaust gases along the doser axis past the distal end and is formed to include a plurality of outlet holes arranged circumferentially around the doser axis and configured to discharge the exhaust gases from the swirl chamber into the exhaust passageway in a plurality of directions radially away from the doser axis, wherein the inlet-reactor provides a swirl cone defining at least a portion of the swirl chamber and includes a doser mount coupled to the mixer body and configured to receive the doser, an outer chamber wall that extends axially into the exhaust passageway relative to the doser axis and provides a radial boundary of the swirl chamber, and a first flow-directing fin that extends into the swirl chamber to provide a first flow passageway and a second flow passageway.

6. The reagent mixer of claim 5, wherein the outer chamber wall includes a peripheral wall that cooperates with the first flow-directing fin to define the first flow passageway and a second flow-directing fin that cooperates with the first-flow directing fin to define the second flow passageway.

7. The reagent mixer of claim 6, wherein the first flow passageway and the second flow passageway are triangular shaped when viewed perpendicularly to the doser axis.

8. The reagent mixer of claim 6, wherein the first flow-directing fin includes a first end that extends into the exhaust passageway generally parallel with the doser axis and a second end arranged in the swirl chamber that extends into the exhaust passageway at an angle relative to the doser axis.

9. The reagent mixer of claim 8, wherein the second flow-directing fin includes first end defining a first edge of the primary inlet aperture that extends into the exhaust passageway generally parallel with the doser axis and a second end coupled to the peripheral wall that extends into the exhaust passageway at an angle relative to the doser axis.

10. The reagent mixer of claim 9, wherein the peripheral wall includes a first end defining a second edge of the primary inlet aperture that extends into the exhaust passageway generally parallel with the doser axis and a second end coupled to the second flow-directing fin that extends into the exhaust passageway at an angle relative to the doser axis.

11. The reagent mixer of claim 5, wherein the outer chamber wall includes a peripheral wall that cooperates with the first flow-directing fin to define the first flow passageway and a second flow-directing fin that cooperates with the first-flow directing fin to define the second flow passageway.

12. The reagent mixer of claim 11, wherein the first flow-directing fin includes a first end that extends into the exhaust passageway generally parallel with the doser axis and a second end arranged in the swirl chamber that extends into the exhaust passageway at an angle relative to the doser axis.

13. The reagent mixer of claim 11, wherein the second flow-directing fin includes first end defining a first edge of the primary inlet aperture that extends into the exhaust passageway generally parallel with the doser axis and a second end coupled to the peripheral wall that extends into the exhaust passageway at an angle relative to the doser axis.

14. The reagent mixer of claim 5, wherein the plurality of holes in the outlet reactor are spaced selectively from an injection point of the doser axially along the doser axis at a predetermined distance so that a trajectory of the reagent injected by the doser is directed away from an outer edge of each of the plurality of holes.

15. A reagent mixer comprising a mixer body including a mixer can defining at least a portion of an exhaust passageway that extends along a primary axis and an upstream baffle plate formed to include a primary inlet aperture that allows exhaust gases to flow therethrough parallel with the primary axis, a doser configured to inject a reagent into the exhaust passageway generally along a doser axis that is perpendicular to the primary axis, and a swirl unit including (a) an inlet reactor configured to induce rotation of the exhaust gases flowing through the primary inlet aperture about and along the doser axis and (b) an outlet reactor coupled to the inlet reactor and cooperating with the inlet reactor to provide a swirl chamber that extends along the doser axis, wherein the outlet reactor has a distal end that is closed to block flow of the exhaust gases along the doser axis past the distal end and is formed to include a plurality of outlet holes arranged circumferentially around the doser axis and configured to discharge the exhaust gases from the swirl chamber into the exhaust passageway in a plurality of directions radially away from the doser axis, wherein the outlet reactor includes a side wall at a proximal end of the outlet reactor and a dome at a distal end of the outlet reactor providing the closed end and defining a length of the outlet reactor between the proximal end and the distal end and the plurality of holes are spaced apart from the proximal end of the outlet reactor greater than 50 percent of the length.

16. The reagent mixer of claim 15, wherein the plurality of holes are radially aligned so that the plurality of holes form a row extending circumferentially around the doser axis.

17. A reagent mixer comprising a mixer body including a mixer can defining at least a portion of an exhaust passageway that extends along a primary axis and an upstream baffle plate formed to include a primary inlet aperture that allows exhaust gases to flow therethrough parallel with the primary axis, a doser configured to inject a reagent into the exhaust passageway generally along a doser axis that is perpendicular to the primary axis, and a swirl unit including (a) an inlet reactor configured to induce rotation of the exhaust gases flowing through the primary inlet aperture about and along the doser axis and (b) an outlet reactor coupled to the inlet reactor and cooperating with the inlet reactor to provide a swirl chamber that extends along the doser axis, wherein the outlet reactor has a distal end that is closed to block flow of the exhaust gases along the doser axis past the distal end and is formed to include a plurality of outlet holes arranged circumferentially around the doser axis and configured to discharge the exhaust gases from the swirl chamber into the exhaust passageway in a plurality of directions radially away from the doser axis, wherein the mixing can further includes a downstream baffle that extends across the exhaust passageway perpendicular to the primary axis and the downstream baffle is formed to include a plurality of discharge openings that increase in size as the downstream baffle extends axially along the doser axis from the outlet reactor to the inlet reactor to encourage further mixing of the exhaust gases between the swirl unit and the downstream baffle before the exhaust gases are released through the plurality of discharge openings.

18. The reagent mixer of claim 17, wherein the plurality of holes in the outlet reactor are spaced selectively from an injection point of the doser axially along the doser axis at a predetermined distance so that a trajectory of the reagent injected by the doser is directed away from an outer edge of each of the plurality of holes.

* * * * *